(12) United States Patent
Mori et al.

(10) Patent No.: US 6,661,128 B2
(45) Date of Patent: Dec. 9, 2003

(54) TWO-PHASE EXCITATION LINEAR MOTOR

(75) Inventors: Hidehiko Mori, Hachiouji (JP); Yasushi Koyanagawa, Isehara (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 40 days.

(21) Appl. No.: 10/067,969

(22) Filed: Feb. 8, 2002

(65) Prior Publication Data

US 2003/0151314 A1 Aug. 14, 2003

(51) Int. Cl.[7] .......................... H02K 41/00; H02K 41/02
(52) U.S. Cl. ............................................. 310/12; 310/13
(58) Field of Search ............................ 310/12, 13, 15, 310/17

*Primary Examiner*—Nestor Ramirez
*Assistant Examiner*—Iraj A. Mohandesi
(74) *Attorney, Agent, or Firm*—Arent Fox Kintner Plotkin & Kahn

(57) ABSTRACT

A two-phase excitation linear motor is provided, having a compact size and a large thrust force simultaneously. Each of two single coils is formed to have an almost rectangular ring-like shape where two sides opposing to each other function as a pair of effective conductors, and the other opposing two sides function as a pair of connecting conductors for connecting between the effective conductors. The connecting conductors are offset at an almost right angle. The two single coils are integrated such that the one effective conductor of the pair of effective conductors of the one single coil is interposed between the pair of effective conductors of the other single coil while the single coils are being combined such that the offset directions of the connecting conductors of the individual single coils are opposite to each other in a direction perpendicular to a traveling direction.

5 Claims, 9 Drawing Sheets

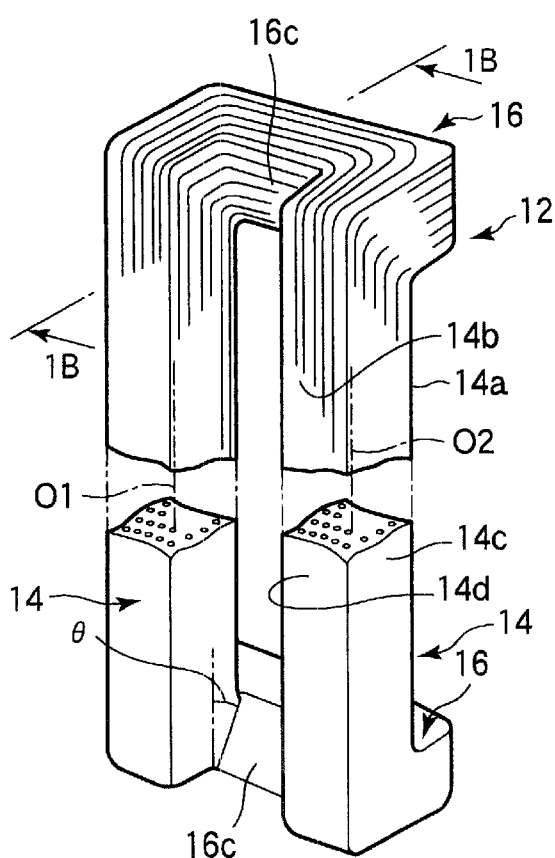
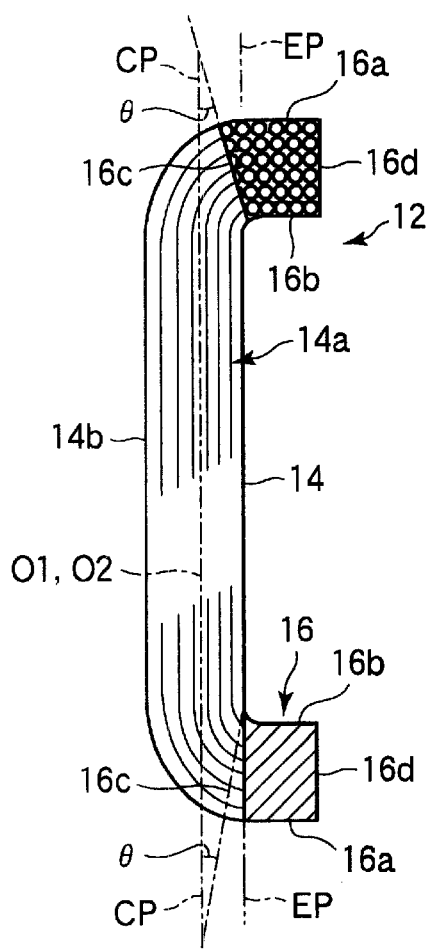
FIG.1A
FIG.1B

| | SEPARATE ONE-POLE TYPE (CONVENTIONAL RACETRACK-SHAPE) | INTEGRATED ONE-POLE TYPE (PRESENT INVENTION) | INTEGRATED TWO-POLE SEPARATE TYPE (PRESENT INVENTION) | SEPARATE CONNECTED ONE-POLE TYPE (PRESENT INVENTION) |
|---|---|---|---|---|
| FIGURE | FIG.15 | FIG.4 | FIG.5 | FIG.6 |
| SYSTEM LENGTH (mm) RATIO | 1 | 0.69 | 1.38 | 1.25 |
| THRUST CONSTANT (N/ARMS) RATIO | 1 | 1.00 | 2.00 | 1.81 |
| MOTOR CONSTANT (N/√W) RATIO | 1 | 1 | 1.41 | 1.27 |

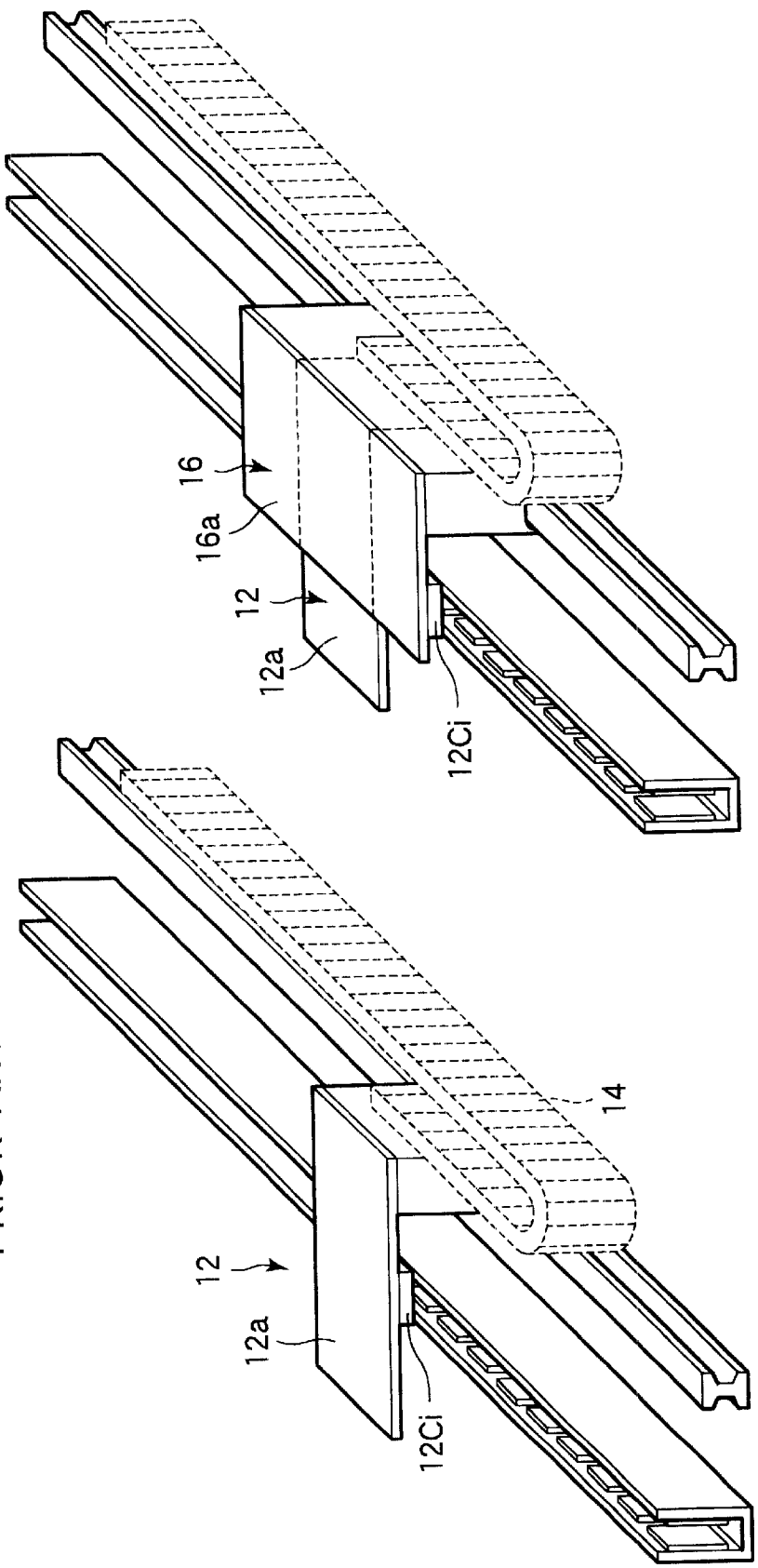

TWO-PHASE EXCITATION LINEAR MOTOR

BACKGROUND OF THE INVENTION

1. Field of the Invention

The present invention relates to a two-phase excitation linear motor.

2. Description of the Related Art

A linear motor has a simple structure, comprises a small number of parts, and drives a moving body linearly, and its drive is precise and quick. The linear motor is widely applied to linear driving devices and positioning devices in all fields such as exposing devices for manufacturing semiconductors, and highly precise machine tools.

In a general liner motor, as shown in FIG. 8, a current is allowed to flow through a coil unit (a moving body in this example) Ci placed between magnet rows Mg opposing to each other (fixed body in this example), and a Lorentz force generated drives the coil unit Ci. The magnet rows Mg are arranged such that the direction of a pair of an N pole and an S pole opposing to each other is altered one by one as shown in FIG. 9. A distance between the closest pairs of N/S poles facing in the same direction is referred as a magnetic pole pitch. A sinusoidal magnetic flux density distribution is generated between the magnet rows Mg where the magnetic pole pitch is one cycle. The magnetic pole pitch after normalization is represented as $2\pi$.

The individual single coils 2 for constituting the coil unit Ci are in an approximately rectangular ring-like shape (a racetrack shape) as a whole as shown in FIG. 10. Two sides of the four sides of this rectangle opposing to each other in a direction perpendicular to a traveling direction function as a pair of effective conductors 4a and 4b for contributing to generating a thrust force for a moving body in a linear motor. The other two sides opposing to each other form a pair of connecting conductors 6a and 6b for connecting between the effective conductors 4a and 4b, and these parts do not specifically contribute to generating a thrust force for the linear motor.

When a current is allowed to flow through the single coil 2, the directions of the current are opposite to each other between the effective conductors 4a and 4b (indicated as U and U macron). Thus, because the signs of the magnetic fluxes are opposite to each other, when the distance T1 between the effective conductors 4a and 4b is set to a distance corresponding to $\pi$, the thrust force becomes twice as much as that generated on one effective conductor 4a or 4b.

It is necessary to provide a constant thrust force wherever the single coil 2 may be positioned along the magnet rows Mg for operating the linear motor smoothly. Because the magnetic flux density has the sinusoidal distribution, it is impossible to use one single coil for providing a constant thrust force in whatever way the current may be adjusted. It is necessary to connect the multiple single coils placed with intervals as one pole.

Three phases of (three) single coils 2U, 2V, and 2W are arranged such that their positional phases are displaced by an amount corresponding to $(2/3)\pi$ to one another for using them as one pole in a three-phase excitation motor as shown in FIG. 11. Then, when a current with a phase matching the phases of the magnetic flux densities at the effective conductors 4a and 4b of the individual single coils 2U, 2V, and 2W is allowed to flow therethrough as shown in FIG. 12, a constant thrust force can be obtained even if the positions of the three single coils 2U, 2V, and 2W (a coil unit Ci3 as a whole) move.

On the other hand, two single coils 2A and 2B are displaced by an amount corresponding to $\pi/2$ as a positional phase to form one pole for a two-phase excitation motor as shown in FIG. 13. A distance between the two single coils 2 corresponds to $\pi$, and the single coil itself is identical to that for the three-phase excitation motor. Then, when a current with a phase matching the phases of the magnetic flux densities at the effective conductors 4a and 4b is allowed to flow through the individual single coils 2A and 2B as shown in FIG. 14, a constant thrust force can be obtained even if the positions of the two single coils 2A and 2B (a coil unit Ci2 as a whole) move.

Because three-phase excitation motors can maintain a motor constant (N/√W: a thrust force provided with an equivalent current) high, three-phase excitation motors are used more than two-phase excitation motors in general.

However, the two-phase excitation motors can be applied to an area of the applications where the three-phase excitation motors cannot meet a dimensional requirement.

When the three-phase excitation motor or the two-phase excitation motor is structured such that multiple single coils for the individual phases are simply piled up as shown in FIG. 11 or FIG. 13, the distance M3 or M2 between the magnet rows opposing to each other increases, thereby decreasing the magnetic flux density. It is necessary to arrange the effective conductors for the individual phases in a single row, thereby minimizing the distance M2 or M3 between the magnet rows Mg, resulting in constituting an effective linear motor. However, a simple racetrack shape as in FIG. 10 prevents arranging the effective conductors 4a and 4b in a single row because of the existence of the connecting conductors 6a and 6b. There have been different types of proposals for the arrangement while the mutual interference between the connecting conductors 6a and 6b is avoided as much as possible.

Because it is primarily required for the two-phase excitation motors to reduce the size as described before, a method to arrange two single coils 2A and 2B corresponding to the A phase and the B phase separately in the same row while the coils are maintained to have the racetrack shape as shown in FIG. 15 is adopted especially to maintain the distance between the magnet rows as short as possible.

When the two single coils 2A and 2B are separated while their phases in the magnetic flux density are being maintained, they can function as a two-phase excitation motor; A form where single coils are arranged separately is referred as a "separate type" two-phase excitation motor for convenience in the present specification. Though FIG. 15 shows a case where two single coils are separated by $(2k+\frac{1}{2})\pi$ (k=1, 2, 3, . . .), the phases of the individual single coils 2A and 2B should be opposed to each other when they are separated by $(2k-\frac{1}{2})\pi$ as shown in FIG. 16.

FIG. 17 shows an: example of the applications.

A main motor is indicated as a symbol 12 in FIG. 17, and is constituted with a conventional three-phase excitation motor. Because a coil unit 12Ci for the main motor 12 is used with multiple poles in general, a wiring harness 14 for wiring the coil unit 12Ci becomes thick and heavy, and becomes a resistance when the coil unit 12Ci for the main motor 12 travels. Then, a separate type two-phase excitation motor 16 is separately provided such that the motor 16 strides across the main motor 12 to drive the wiring harness 14 in synchronization with the main motor 12 as shown in FIG. 17 (B). Gaps are provided between a case 12a for the main motor 12 and a case 16a for the two-phase excitation motor 16 to prevent a contact between these cases when there is a difference between their travels. Thus, the two-phase excitation motor 16 does not affect the travel of the main motor 12 at all (while the motor 16 moves in synchronization with the motion of the main motor 12). Because the wiring harness 14 is attached to the two cases 16a for the two-phase excitation motor 16, and the wiring harness 14 does not affect the travel of the main motor 12 at all (while the harness 14 moves in synchronous with the motion of the main motor 12).

When a separate type two-phase excitation motor is applied in this way, the separated single coils do not cause any problems, and the separate existence becomes an advantage on the contrary.

Though placing two single coils separately can be used as an application method for the two-phase excitation motors, the predetermined dimensions are specified for the spacing, and the arrangement of them may be very difficult in some cases. Also, a weak thrust force is one of the major disadvantages of the two-phase excitation motors.

SUMMARY OF THE INVENTION

The present invention was devised in view of the foregoing, and an object of the present invention is to manufacture a two-phase excitation motor where single coils satisfying a predetermined shape condition are used to form a two-phase excitation motor as "integrate type", thereby applying it while a magnetic flux density generated by magnet rows is increased as high as possible (in a form for increasing the thrust force).

Another object of the present invention is to provide a two-phase excitation motor which is constituted as a separate type motor using the integrate type coils corresponding to two poles, and can increase a thrust force by an amount corresponding to the increased pole. Still another object of the invention is to provide a two-phase excitation motor which has a shape of a conventional "separate type" two-phase excitation motor, and simultaneously provides a thrust force more than that provided by the conventional separate type two-phase excitation motor.

A two-phase excitation linear motor according to a first aspect of the present invention includes two single coils forming one pole to continuously generate magnetic forces with a predetermined phase interval thereon, the magnetic forces linearly driving a moving body, wherein the two single coils are individually formed as an approximately rectangular ring-like shape where two sides of the rectangle opposing to each other function as a pair of effective conductors for contributing to generating a thrust force for the moving body of the linear motor, and the other two sides opposing to each other function as a pair of connecting conductors for connecting between the effective conductors, parts close to the ends of the effective conductors are bent at an approximately right angle with respect to a coil plane such that the pair of connecting conductors are offset from the coil plane, and extend in parallel with the coil plane where the coil plane is defined as a plane including individual centers of the pair of effective conductors, and the two single coils are integrated into one body such that one of the pair of effective conductors of one single coil is interposed between the pair of effective conductors of the other single coil while the individual single coils are combined such that the offset directions of the connecting conductors of the individual single coils are opposed to each other in a direction perpendicular to a traveling direction. By providing this two-phase excitation linear motor, the above-mentioned problems are solved.

When each of the single coils has a simple racetrack shape, the storage of the individual single coils becomes a problem if the multiple single coils are connected to form a coil unit as described before. Because a two-phase excitation motor has a lower motor constant compared with that of a three-phase excitation motor by nature, and it is senseless to adopt a two-phase excitation motor unless the cost or the size can be reduced, a drive constitution using racetrack-shape single coils as a separate type has been exclusively adopted.

The present invention was intended to devise a shape of a coil to use a two-phase excitation motor not as "separate type" but as "integrate type" as one pole.

The parts close to the ends of the effective conductors are bent at an approximately right angle with respect to the coil plane such that the connecting conductors are offset from (separated in parallel with) the coil plane in the single coil according to the present invention. Then, the two single coils are integrated into one body such that one of the pair of effective conductors of one single coil is interposed between the pair of effective conductors of the other single coil while the individual single coils are combined such that the offset directions of the connecting conductors of the individual single coils are opposed to each other in a direction perpendicular to the traveling direction.

As a result, the individual effective conductors of the two single coils are arranged in a single row, and simultaneously, the length of the offset of the connecting conductors decreases further. Thus, when the single coils are used to form a coil unit, the projected area of the connecting conductors on a transverse section in the traveling direction is decreased further while they are still the integrate type. Also, because the integrate type forms "one pole", and a part corresponding to this one pole can form a motor, the size of an entire coil unit can be decreased remarkably.

A second aspect of a two-phase excitation linear motor according to the present invention has a characteristic that the transverse section of the connecting conductors is in an approximately trapezoidal shape including parallel sides approximately perpendicular to the coil plane, and a tilted side opposing to the coil plane and being tilted in a direction opposite to the direction of the offset of the connecting conductors in the extending state. This allows manufacturing a more compact coil unit.

A third aspect of a two-phase excitation linear motor according to the present invention has a characteristic that two or more integrated two-phase (two) single coils are placed in separate positions for multi-polarization.

Though this arrangement embodiment appears similar to that of the separate type two-phase excitation motor, the present invention largely differs from the "separate type" in a point that the individual two coils forms "one pole", and the entire device is two-phase multi-polarized, thereby enabling to obtain double thrust force.

A fourth aspect of a two-phase excitation linear motor according to the present invention includes two single coils forming one pole to continuously generate magnetic forces with a predetermined phase interval thereon, said two single coils being placed separately, the magnetic forces linearly driving a moving body. Here, each of the single coils comprises two sub-single coils each formed as an approximately rectangular ring-like shape where two sides of the rectangle opposing to each other function as a pair of effective conductors for contributing to generating a thrust force for the moving body of the linear motor, and the other two sides opposing to each other function as a pair of connecting conductors for connecting between the effective conductors. The two sub-single coils are integrated into one body such that one of the pair of effective conductors of one sub-single coil is interposed between the pair of effective conductors of the other sub-single coil, while the two sub-single coils are connected to each other in series to form one connected-single coil and the two connected-single coils are separately arranged as said single coil for forming one pole.

This arrangement also appears similar to that of the separate type two-phase excitation motor. However, the present invention differs from the conventional "separate type" in a point that the single coil at each location is not a simple racetrack-shape single coil, the single coil (to which any one of the first to third aspects of the invention is applied) is used as a "sub-single coil", the single coils are coupled to form a "connected-single coil", and the two connected-single coils are separately placed to constitute one pole while they serve as the separate type.

Thus, another (connected-) single coil wired in series in the same way is required to form a single pole as a two-phase. excitation motor. Therefore, it also belongs to a category of the "separate type" two-phase excitation motors in terms of the form.

Because two (sub-) single coils are connected in series to form a "one-phase" (connected-) single coil in this motor, the number of turns n for each phase is twice as many as that of the single coil according to the conventional, or any one of the first to third aspects of the invention. In general, when the number of turns n increases to obtain a large thrust force, the area of a transverse section of the connecting conductors as well as that of the effective conductors increases, the storage of the single coil becomes degraded, and a dimension in terms of thickness as the single coil increases. Thus, it is unavoidable to increase the distance between the magnet rows accordingly. However, because the individual sub-single coils according to this aspect of the present invention have the number of turns similar to that for the conventional single coil, the dimension in terms of thickness approximately corresponds to that of one sub-single coil, and is not so large. Above all, because it is possible to properly select whether the sub-single coil is used for a single coil or for a connected-single coil, there is an advantage that a simple design change can realize a motor having a different thrust force.

BRIEF DESCRIPTION OF THE DRAWINGS

The preferred embodiments will be described with reference to the drawings, wherein like embodiments have been noted throughout the figures with like reference numerals and wherein:

FIG. 1 shows a single coil of a coil unit for a linear motor according to the present invention, where (A) is a perspective view thereof, and (B) is a section thereof taken along a line indicated by arrows 1B of (A);

FIG. 17 is a perspective view showing an application of the separate type two-phase excitation motor.

DETAILED DESCRIPTION OF THE PREFERRED EMBODIMENTS

Figure 2:
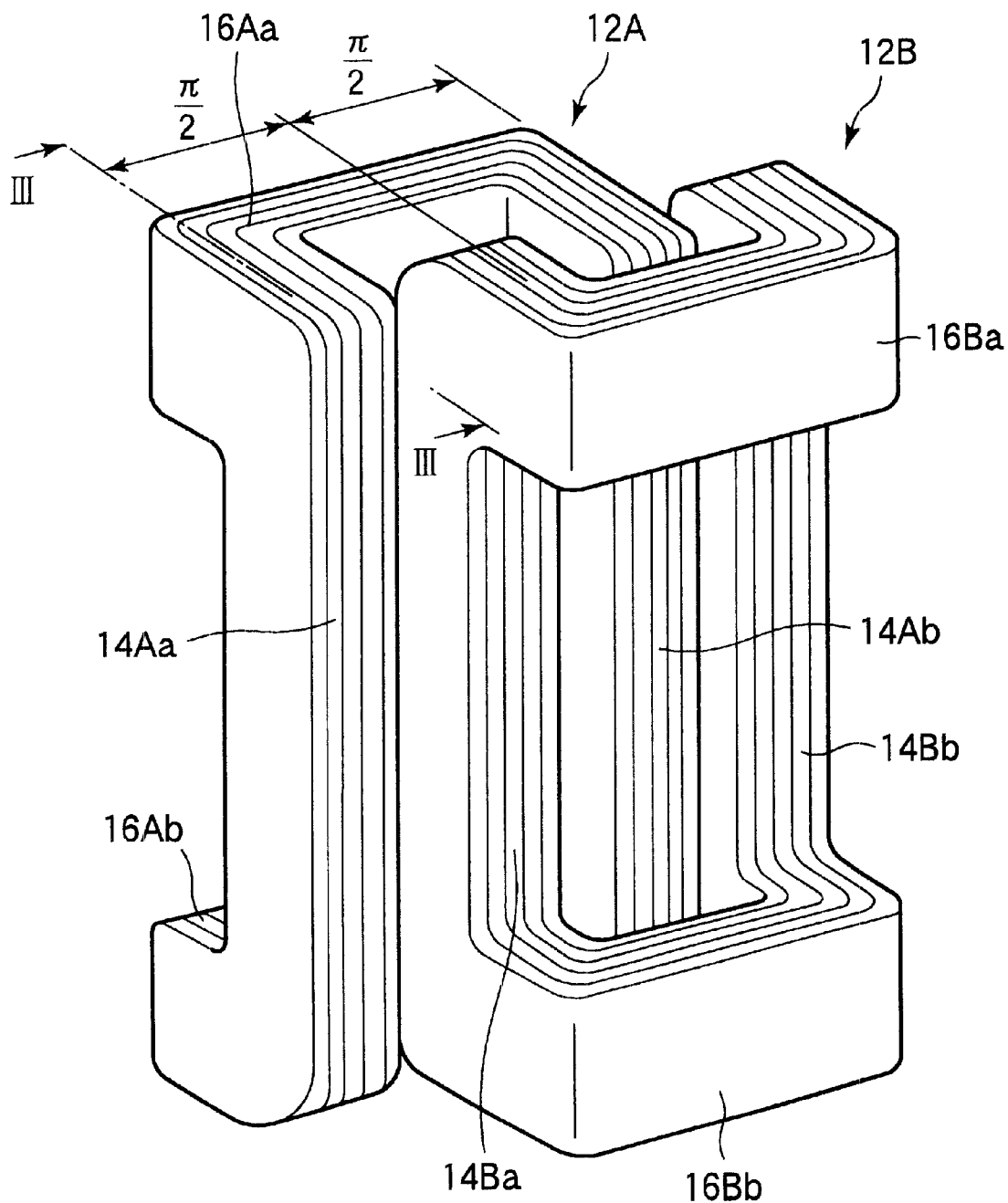
FIG. 2 is a perspective view showing an integrated state of a coil unit using the single coils.

Hereinafter, preferred embodiments of the present invention will be described in detail with reference to the accompanying drawings.

FIG. 1 shows a single coil of a coil unit for a two-phase excitation linear motor according to an embodiment of the present invention. (A) is a perspective view thereof, and (B) is a sectional view thereof taken along a line indicated by arrows 1B indicated in (A).

The single coil 12 is in an almost rectangular ring-like shape as a whole, two sides of this rectangle opposing to each other function as a pair of effective conductors 14 for contributing to generating a thrust force for a moving body of the linear motor, and the other two sides opposing to each other function as a pair of connecting conductors 16 for connecting between the effective conductors 14.

A plane including the centers of the individual effective conductors 14 is defined as a coil plane CP for convenience.

Parts close to the ends on the effective conductors 14 are bent at an approximately right angle with respect to the coil plane CP such that the pair of connecting conductors 16 are offset from the coil plane CP, and extend in parallel with the coil plane CP.

On the other hand, the transverse section of the connecting conductors 16 is in an approximately trapezoidal shape including, in this bending state, parallel sides 16a and 16b approximately perpendicular to the coil plane CP, a tilted side 16c which opposes to the coil plane CP, and is tilted in a direction opposite to the direction of the bend (the offset) of the connecting conductors 16, and a side 16d on a side opposite to the coil plane.

As a result, because the tilted side 16c is positioned on the coil plane CP side, and the sides 16a (one of the two parallel sides 16a and 16b) and the 16d are respectively positioned on an outer periphery of the connecting conductors 16, planes perpendicular to and parallel with the coil plane CP appear on the outer periphery thereof.

A tilt angle θ of the tilted side 16c with respect to the coil plane CP is set to approximately 15 degrees in the present embodiment.

The section of the effective conductors 14 has a rectangular shape, and includes side surfaces 14a and 14b parallel to the coil plane CP, and outer side surfaces 14c and 14d perpendicular to them. The tilted side 16c is positioned between a plane EP including the side surface 14a on the bent side, and the coil plane CP.

The "trapezoid" as the sectional shape of the connecting conductors 16 is not necessarily a precise trapezoid in a geometrical sense, and the "trapezoid" of the present invention includes a shape with rounded corners or the individual sides 16a to 16d curved more or less.

The following section describes actions of the single coil 12 based on the shape thereof while describing a constitution and actions when the single coils 12 are applied to a two-phase excitation linear motor.

One single coil 12 forms a "one-phase" of the two-phase excitation motor in a first embodiment. Thus, the two single coils are required for constituting the two-phase excitation motor. In the present embodiment, first, the single coils are combined such that an offset direction of connecting conductors 16Aa and 16Ab of a single coil 12A, and an offset direction of connecting conductors 16Ba and 16Bb of a single coil 12B are opposite to each other in a direction perpendicular to the traveling direction as shown in FIG. 2. The two single coils 12A and 12B are integrated into one body such that one effective conductor 14Ba of a pair of effective conductors 14Ba and 14Bb of the single coil 12B is interposed between the pair of the effective conductors 14Aa and 14Ab of the other single coil 12A.

Figure 3:
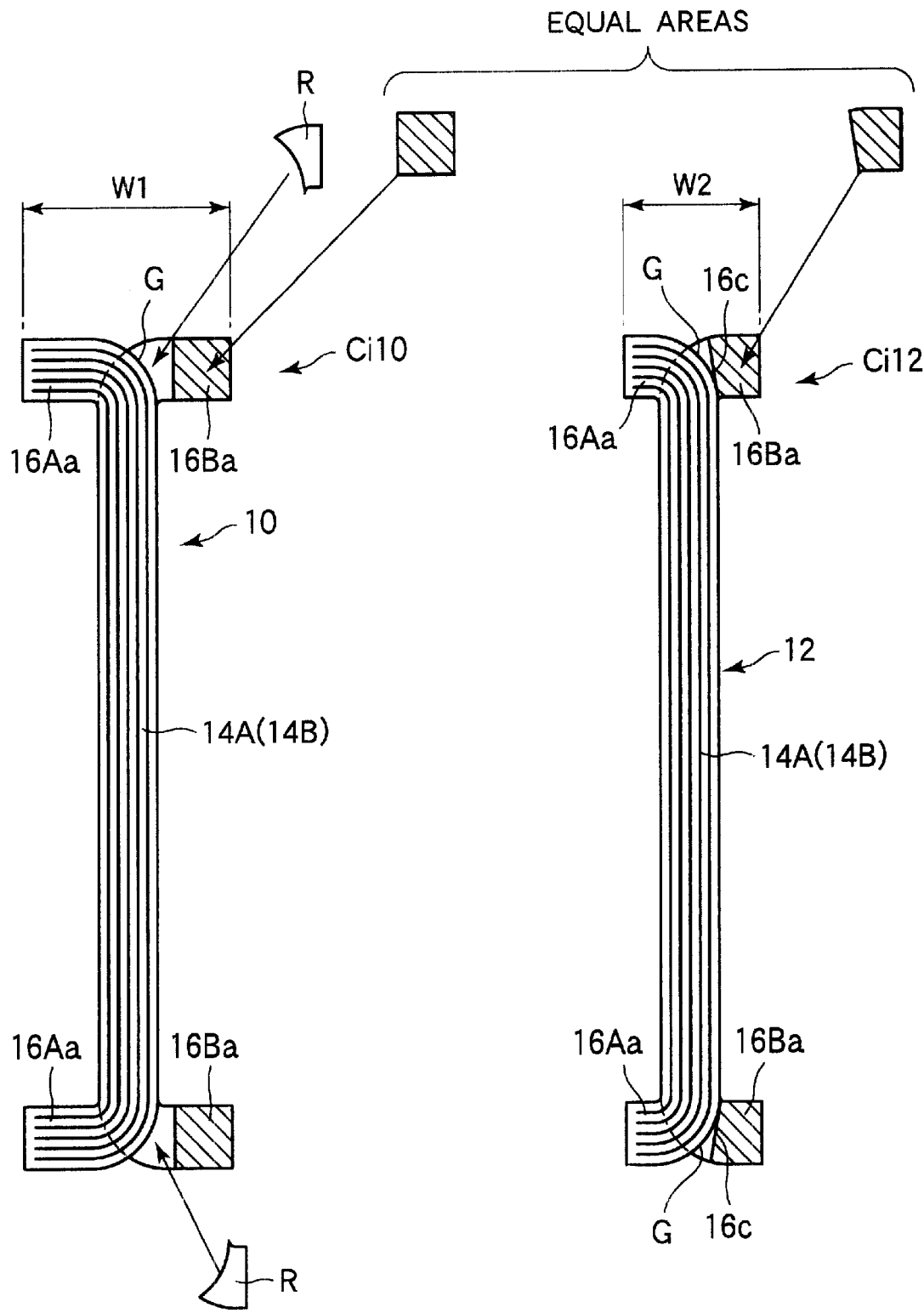
FIG. 3 is a sectional view corresponding to a longitudinal sectional view taken along a line indicated by arrows III in FIG. 2 which shows an integrated state of the coil unit using the single coils, where (A) shows a section without a tilted side θ, and (B) shows a section with the tilted side θ.

An arrangement with respect to the magnet rows Mg will be described later, and the following section describes an effect of the tilted side. FIG. 3 shows this integrated state. (A) shows a case where the tilt θ is not formed, and (B) shows a case where the tilt θ is formed. A coil unit Ci10 in (A) of FIG. 3 is more compact than a case where conventional racetrack-shape single coils are integrated to form a coil unit, and is constituted itself so as to provide the effect of the present invention. However, it is not possible to avoid interference between the connecting conductors 16 of the single coils 12 next to each other unless a transverse width W1 of the connecting conductors 16 with respect to the traveling direction (a total offset width of the connecting conductors 16 being assembled) is set to fairly large.

On the other hand, in the single coil Ci12 shown in FIG. 3 (B), the tilted side 16c has a tilted angle θ in a direction opposite to the bent (offset) direction of the connecting conductors 16 with respect to the coil plane CP. Furthermore, the title side 16c is set inside (on the coil plane side) of the plane EP (see FIG. 1) including a side surface 14a of the effective conductors 14. As a result, the existence of the tilt angle θ allows shifting the transverse section of the connecting conductors 16 toward the coil plane CP side largely while interference between an outer periphery G of the bent part of the neighboring connecting conductors 16 and the tilted side 16c is avoided.

Thus, a transverse width W2 of the connecting conductors 16 with respect to the traveling direction (a total offset width of the connecting conductors 16 being assembled) can be reduced from the W1, and an unnecessary area (space) R is eliminated to provide a more compact storage. This reduction contributes to reducing the width of the linear motor LM in the transverse direction with respect to the traveling direction, and a thicker casing may be used when the same width can be maintained, thereby enabling a more stable travel, and generating a stronger thrust force depending on a design.

In addition, because the transverse section of the connecting conductors 16 is a trapezoid, the outer periphery of the connecting conductors 16 is perpendicular to or parallel with the coil plane CP, thereby presenting an excellent fit to a mounting member or a magnetic pole unit.

The single coil 12 (or 10) may be manufactured with any specific way. Namely, as long as a resultant shape eventually has the shape according to the present invention, the prescribed effects of the present invention can be provided.

Figure 4:
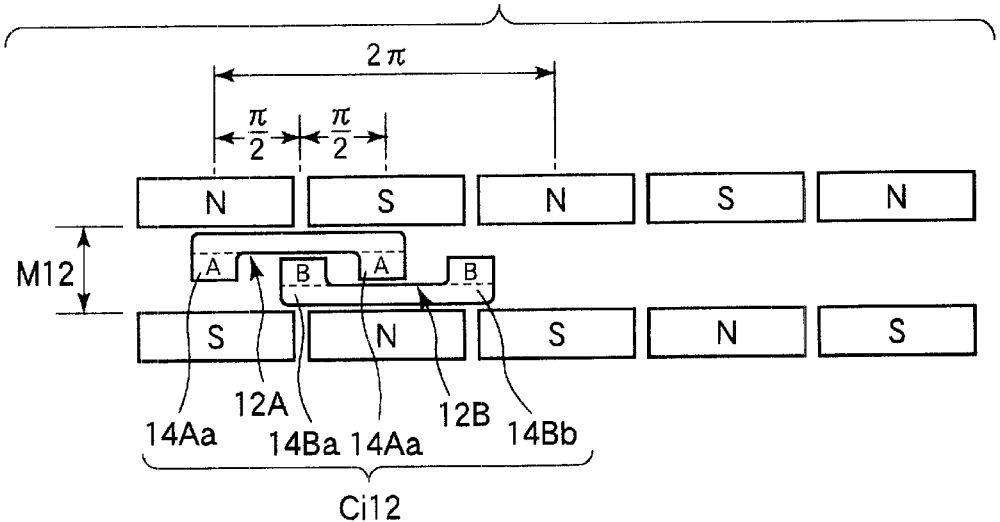
FIG. 4 is a schematic plan view showing an arrangement example of the coil unit.

The two-phase (one pole) coil unit Ci12 (or Ci10) combined in this way is arranged as shown in FIG. 4.

The magnetic pole pitch of a fixed body is $2\pi$, and the interval between the pair of effective conductors 14Aa and 14Ab, and the interval between the effective conductors 14Ba and 14Bb are $\pi$. The effective conductor 14Ba of the pair of effective conductors 14Ba and 14Bb of the single coil 12B is interposed between the pair of effective conductors 14Aa and 14Ab of the other single coil 12A such that the effective conductor 14Ba has an interval of $\pi/2$ to the effective conductors 14Aa and 14Ab.

Figure 13:
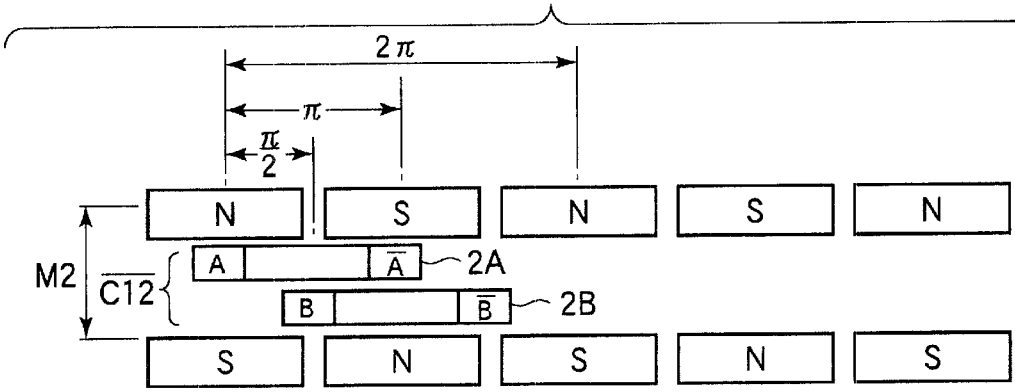
FIG. 13 is a schematic plan view showing an arrangement example of single coils in a two-phase excitation motor.
Figure 14:
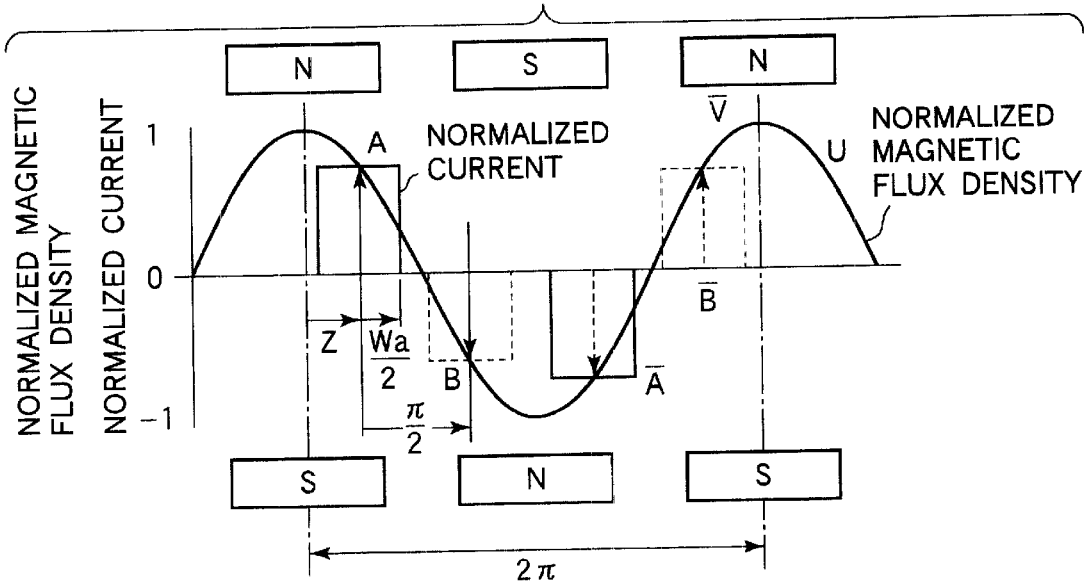
FIG. 14 is a graph showing a state where a normalized magnetic flux density is generated on the two-phase excitation motor.
Figure 15:
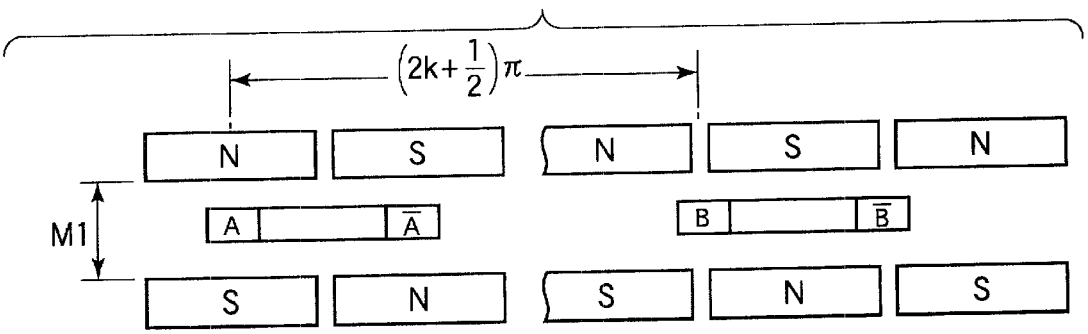
FIG. 15 is a schematic plan view showing an arrangement example of single coils in a separate type two-phase excitation motor.
Figure 16:
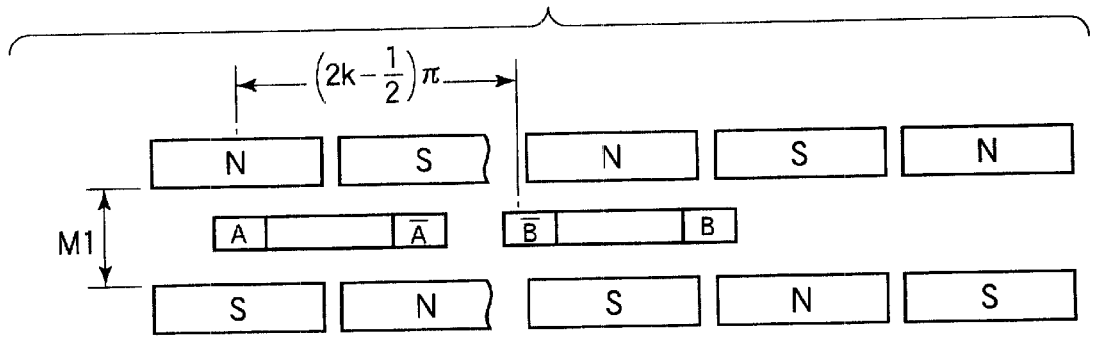
FIG. 16 is a schematic plan view showing another arrangement example of the single coils in the separate type two-phase excitation motor.

A one-pole two-phase excitation linear motor equivalent to the prior art described in FIG. 13 or FIG. 15 in terms of the phase can be constituted in this arrangement. In addition, because the individual effective conductors 14Aa, 14Ab, 14Ba, and 14Bb are arranged completely as a single row on a line L1, a distance M12 between the magnet rows can be reduced, and the magnetic flux density increases accordingly, resulting in a one-pole two-phase excitation linear motor with high efficiency. Because the two single coils 12A and 12B are combined as the coil unit Ci12, and is clustered at one position, the coil unit can be stored in an extremely compact space compared with the conventional separate type one-pole two-phase excitation motor, which have been used exclusively.

Figure 5:
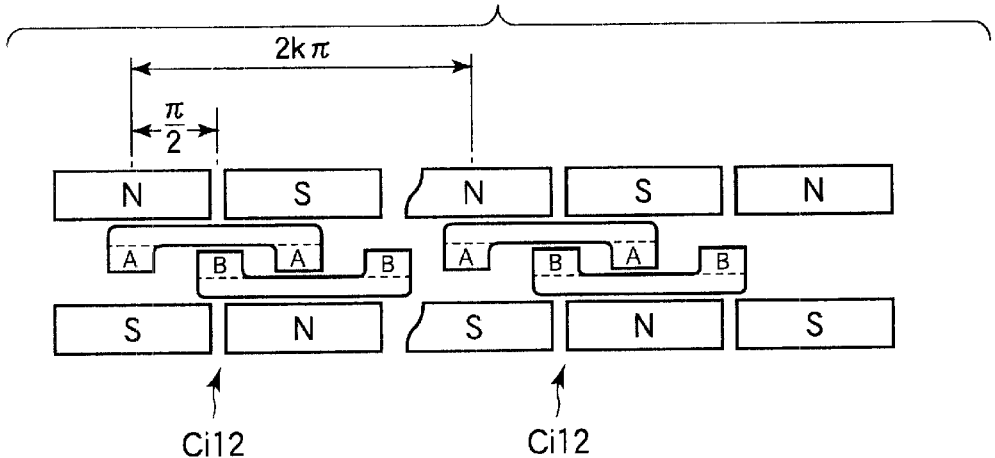
FIG. 5 is a plan view showing another arrangement example.

The two coil units Ci12 shown in FIG. 4 are arranged on the line L1 to form a two-pole two-phase excitation motor as shown in FIG. 5. This motor appears similar to the conventional separate type one-pole two-phase excitation motor. However, since the individual two coils forms "one pole", this motor can provide a thrust force about twice as much as that of the integrate type one-pole two-phase excitation motor in FIG. 4, which corresponds to the doubled poles.

When the P coil units Ci12 are arranged with an interval of $2k\pi$, a P-pole two-phase excitation motor is formed, and provides a thrust force about P times as much as that of the motor in FIG. 4.

Figure 6:
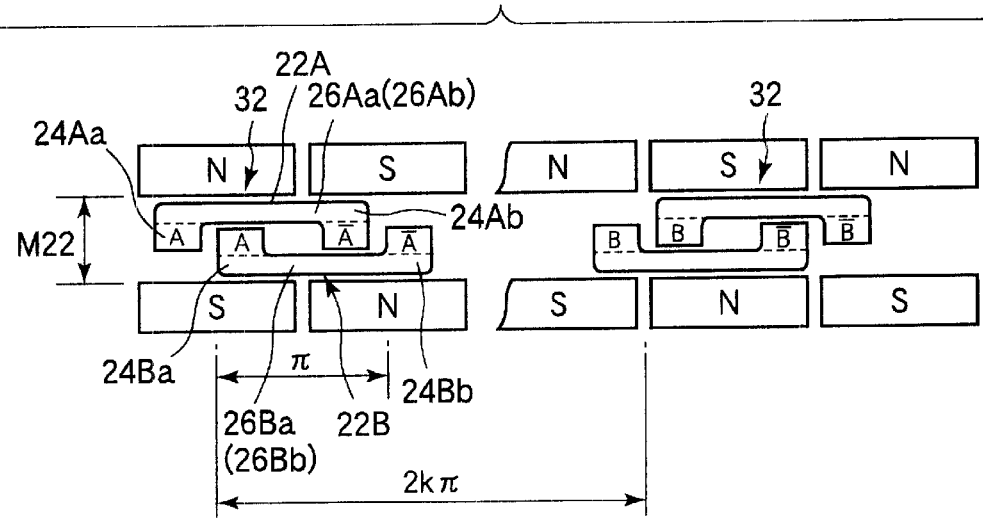
FIG. 6 is a schematic plan view showing an arrangement example of a connected type coil unit.

FIG. 6 shows still another embodiment of the present invention.

The "single coil" referred in the previous embodiments is considered as a sub-single coil, and two of them are connected to form one one-phase connected-single coil in this embodiment.

Thus, how the coils are specifically combined has common aspects with, and different aspects from the previous embodiments.

The common aspects include a point that the offset direction of connecting conductors 26Aa and 26Ab of a coil body 22A, and the offset direction of connecting conductors 26Ba and 26Bb of a coil body 22B are opposite to each other in the direction perpendicular to the traveling direction, and a point that the one effective conductor 24Ba of the pair of effective conductors 24Ba and 24Bb of the coil body 22B is interposed between the pair of effective conductors 24Aa and 24Ab of the other coil body 22A.. Namely, the basic combination itself is similar to that in the previous embodiments.

However, an interval between them is not π/2, and the effective conductors 24Aa and 24Ba, and 24Ab and 24Bb are in contact with each other, respectively, in this embodiment. Both the coil bodies 22A and 22B are connected in series, and are designed such that a current flows in the same direction in the contacted effective conductors 24Aa and 24Bb, or 24Ab and 24Bb. The distances between the centers of the effective conductors 24Aa, 24Ba, and the centers of the effective conductors 24Ab , 24Bb are π, and the distances are maintained.

As a result, two coil bodies 22A and 22B form one single coil 32 with a number of turns twice as many as that of the coil body 22A or 22B. Because this single coil 32 restrains an increase of the length in a thickness direction to the minimum while it has a number of turns twice as many as that of the individual coil body 22A or 22B, it is not necessary to largely increase an interval M22 between the magnet rows Mg.

Because this single coil 32 simply forms a single coil for one phase, it is necessary to install another equivalent single coil 32 to constitute a two-phase excitation coil. Installing another single coil 32 with a predetermined interval 2kπ provides a separate type one-pole two-phase excitation linear motor as shown in FIG. 6.

Figures 7, 8:
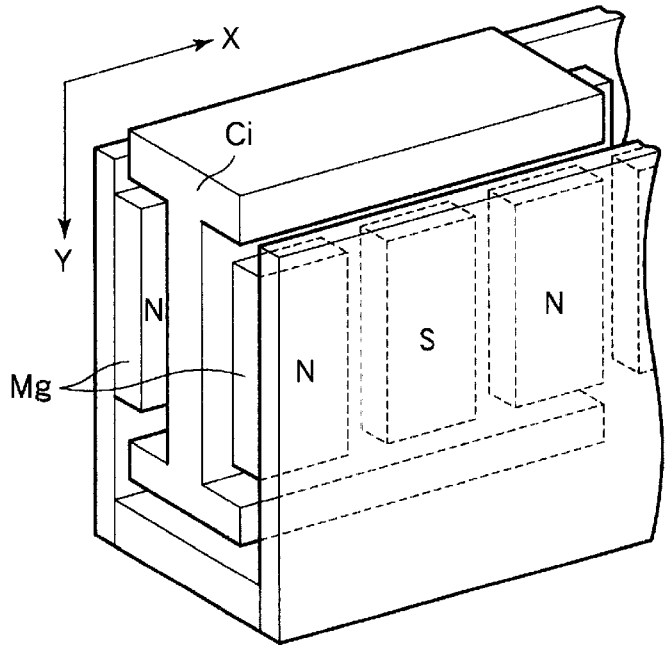
FIG. 7 is a table showing a comparison among characteristics of the individual arrangement examples.
FIG. 8 is a schematic perspective view showing a constitution of a conventional linear motor.
Figure 9:
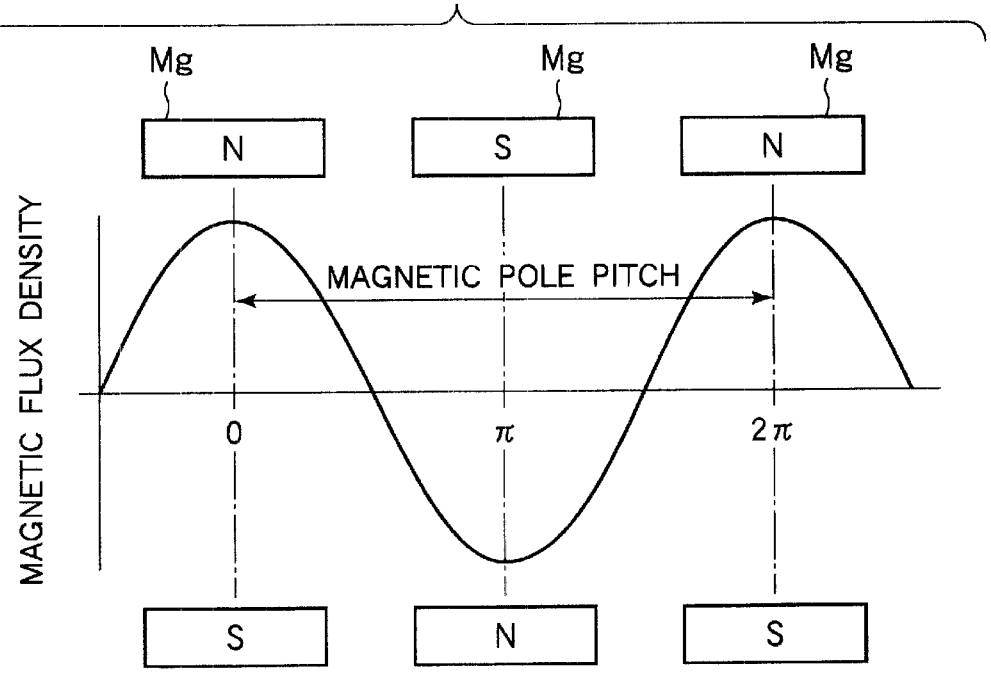
FIG. 9 is a graph showing a magnetic flux generated on the conventional linear motor.
Figure 10:
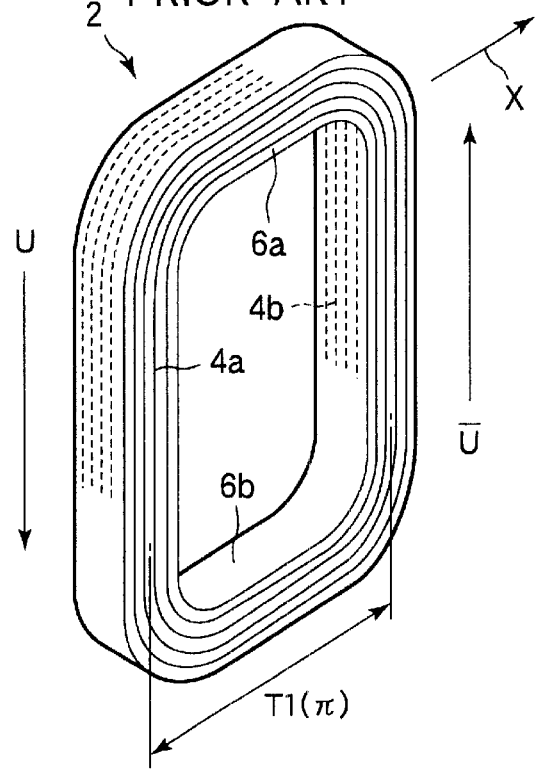
FIG. 10 is a perspective view showing a single coil adopted in the conventional linear motor.
Figure 11:
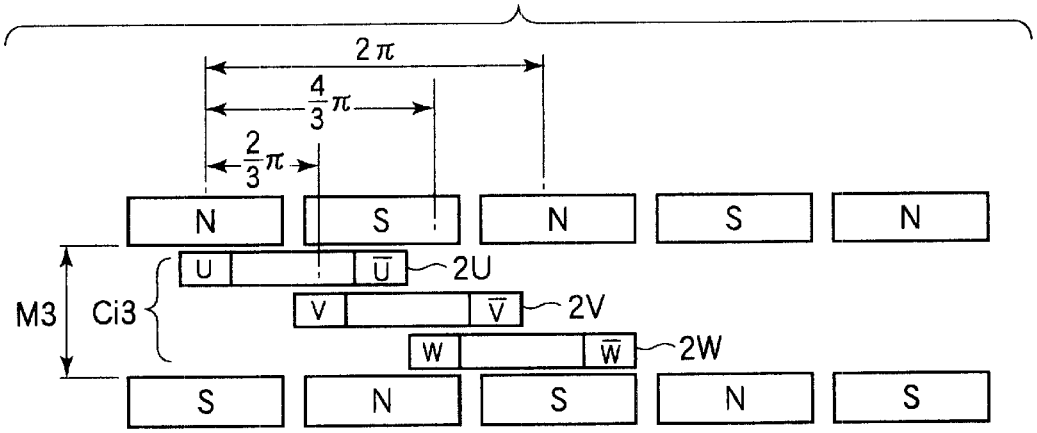
FIG. 11 is a schematic plan view showing an arrangement example of single coils in a three-phase excitation motor.
Figure 12:
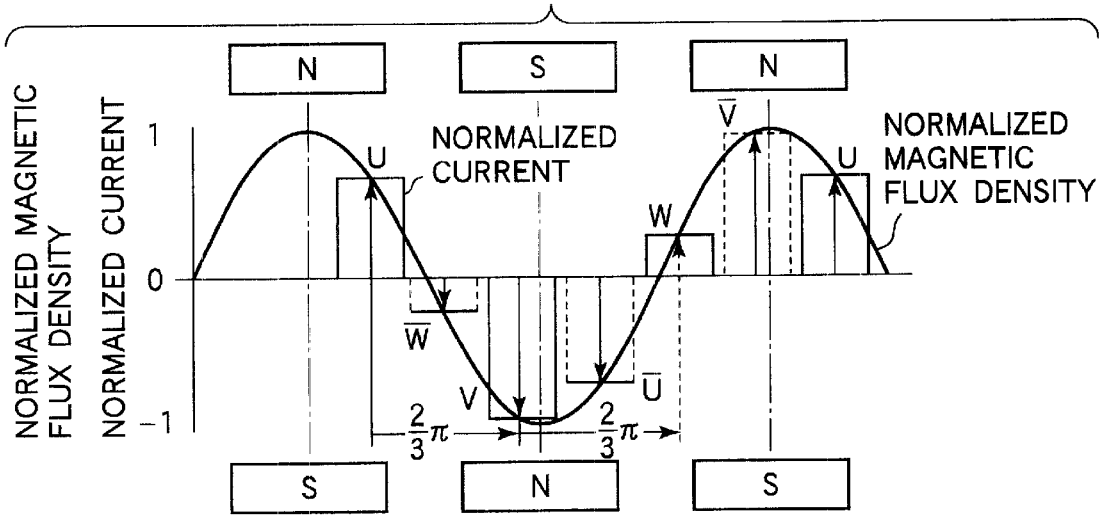
FIG. 12 is a graph showing a state where a normalized magnetic flux density is generated on the three-phase excitation motor.

FIG. 7 is a table for showing ratios of the system length, the thrust constant, and the motor constant of the two-phase excitation motors according to the respective embodiments to those of the conventional racetrack-shape one-pole separate type two-phase excitation motor. The numbers in the table are obtained when the magnetic pole pitch is 72 mm, and the length of a linear part of the coil is 12 mm. The thrust constant and the motor constant depend on the distance between the magnets facing to each other, and the height of the magnets. Although the numbers in the table exemplify only one case, the relative tendency in magnitude does not change.

Because the constitution in FIG. 4 according to the present invention realizes one-pole constitution which has characteristics almost equivalent to those of the conventional separate type one-pole two-phase excitation motor shown in FIG. 15, and is complete by itself as one side so that the length of the coil unit does not increase largely, and fairly increases the efficiency.

The constitution in FIG. 5 according to the present invention employs multi-polarization to increase the thrust force further.

Though the constitution in FIG. 6 according to the present invention still requires another separate (connected) single coil, this constitution provides a larger thrust force corresponding to the increased winding per phase.

Because the distance between the centers of the effective conductors of the coupled (connected) single coils is basically constant, adjusting only the number of (sub-)single coils to be coupled on the moving body adjusts/changes the thrust force without changing the interval between the magnet rows, namely without changing the fixed body. Thus, this constitution is efficient in terms of ease of the design change.

The present invention provides a low cost, compact two-phase excitation motor with a higher efficiency or a higher thrust force.

What is claimed is:

1. A two-phase excitation linear motor comprising:
two single coils forming one pole to continuously generate magnetic forces with a predetermined phase interval thereon, the magnetic forces linearly driving a moving body, wherein
said two single coils are individually formed as an approximately rectangular ring-like shape where two sides of said rectangle opposing to each other function as a pair of effective conductors for contributing to generating a thrust force for the moving body of the linear motor, and the other two sides opposing to each other function as a pair of connecting conductors for connecting between said effective conductors,
parts close to ends of said effective conductors are bent at an approximately right angle with respect to a coil plane such that said pair of connecting conductors are offset from the coil plane, and extend in parallel with said coil plane where the coil plane is defined as a plane including individual centers of said pair of effective conductors, and
the two single coils are integrated into one body such that one of the pair of effective conductors of one single coil is interposed between the pair of effective conductors of the other single coil while the individual single coils are combined such that the offset directions of the connecting conductors of the individual single coils are opposed to each other in a direction perpendicular to a traveling direction.

2. The two-phase excitation linear motor according to claim 1 wherein a transverse section of said connecting conductors is in an approximately trapezoidal shape including parallel sides approximately perpendicular to said coil plane, and a tilted side opposing to said coil plane and being tilted in a direction opposite to the direction of the offset of the connecting conductors in said extending state.

3. The two-phase excitation linear motor according to claim 1 wherein two or more integrated two-phase single coils are placed in separate positions for multi-polarization.

4. The two-phase excitation linear motor according to claim 2 wherein two or more integrated two-phase single coils are placed in separate positions for multi-polarization.

5. A two-phase excitation linear motor, comprising:
two single coils forming one pole to continuously generate magnetic forces time a predetermined phase interval thereon, said two single coils being placed separately, the magnetic forces linearly driving a moving body, wherein
said single coils individually comprise two sub-single coils formed as an approximately rectangular ring-like shape where two sides of said rectangle opposing to each other function as a pair of effective conductors for contributing to generating a thrust force for the moving body of the linear motor, and the other two sides opposing to each other function as a pair of connecting conductors for connecting between said effective conductors,
each of the single coils comprises two sub-single coils each formed as an approximately rectangular ring-like shape where two sides of the rectangle opposing to each other function as a pair of effective conductors for contributing to generating a thrust force for the moving body of the linear motor, and the other two sides opposing to each other function as a pair of connecting conductors for connecting between the effective conductors, and the two sub-single coils are integrated into one body such that one of the pair of effective conductors of one sub-single coil is interposed between the pair of effective conductors of the other sub-single coil, while the two sub-single coils are connected to each other in series to form one connected-single coil and the two connected-single coils are separately arranged as said single coil for forming one pole.

* * * * *